(12) United States Patent
Amerpohl et al.

(10) Patent No.: US 6,737,587 B2
(45) Date of Patent: May 18, 2004

(54) CABLE SEALING END

(75) Inventors: Uwe Amerpohl, Bergisch Gladbach (DE); Wolfgang Belz, Cologne (DE); Gerhard Haupt, Cologne (DE); Bernhard Schindler, Troisdorf (DE); Bodo Bottcher, Ottobrunn (DE)

(73) Assignees: NTK Cables GmbH (DE); Tyco Electronics Raychem GmbH (DE)

( * ) Notice: Subject to any disclaimer, the term of this patent is extended or adjusted under 35 U.S.C. 154(b) by 0 days.

(21) Appl. No.: 10/182,311

(22) PCT Filed: Feb. 9, 2001

(86) PCT No.: PCT/EP01/01425
§ 371 (c)(1),
(2), (4) Date: Jul. 26, 2002

(87) PCT Pub. No.: WO01/59901
PCT Pub. Date: Aug. 16, 2001

(65) Prior Publication Data
US 2003/0003802 A1 Jan. 2, 2003

(30) Foreign Application Priority Data
Feb. 9, 2000 (DE) .......................................... 100 05 703

(51) Int. Cl.$^7$ .............................................. H01B 17/26
(52) U.S. Cl. .................. 174/142; 174/140 C; 174/178; 174/209
(58) Field of Search .................. 174/140 C, 140 H, 174/140 S, 141 R, 141 C, 142, 152 G, 176, 177, 178, 179, 181, 196, 209

(56) References Cited

U.S. PATENT DOCUMENTS

| | | | | |
|---|---|---|---|---|
| 1,870,141 A | * | 8/1932 | Regerbis et al. ........ 174/140 C |
| 3,622,688 A | * | 11/1971 | Link et al. .................. 174/142 |
| 3,646,251 A | * | 2/1972 | Friedrich .................... 174/142 |
| 3,767,843 A | * | 10/1973 | Stone .......................... 174/142 |
| 4,198,538 A | * | 4/1980 | Lusk ........................ 174/140 S |
| 4,296,274 A | * | 10/1981 | Cookson ..................... 174/142 |
| 4,477,692 A | * | 10/1984 | Brealey ..................... 174/31 R |
| 4,584,429 A | * | 4/1986 | Raketti et al. ................ 174/18 |
| 4,670,625 A | * | 6/1987 | Wood et al. ................. 174/142 |
| 4,774,385 A | * | 9/1988 | Toshima ..................... 174/142 |
| 4,965,407 A | * | 10/1990 | Hamm ...................... 174/31 R |
| 5,130,495 A | * | 7/1992 | Thompson ................. 174/73.1 |
| 5,466,891 A | * | 11/1995 | Freeman et al. ............ 174/142 |

FOREIGN PATENT DOCUMENTS

| EP | 0 683 555 | 11/1995 |
|---|---|---|
| FR | 2 547 451 | 12/1984 |

* cited by examiner

*Primary Examiner*—Dean A. Reichard
*Assistant Examiner*—Adolfo Nino
(74) *Attorney, Agent, or Firm*—Harness, Dickey & Pierce, P.L.C.

(57) ABSTRACT

The invention relates to an outdoor sealing end (8) which is elevated on one side. Means (18) for fixing the cable (10) are designed on the base fittings (20). An electric duct (32) is situated inside the sealing end. Additional, conventional means for electrically connecting the cable shield to the earth potential and means for the field control (field control body 33) and the insulation on the inhomogeneous potential transitions on the cable end are provided. The electric duct (32) that is embodied as a pipe or pin is connected to the cable conductor (12) by means of contact elements (42). The duct (32), the insulating body (50) and the top fittings (70) form an assembly unit. The surface of the sealing end is coated with a voltage-dependent field-controlling layer (64).

8 Claims, 3 Drawing Sheets

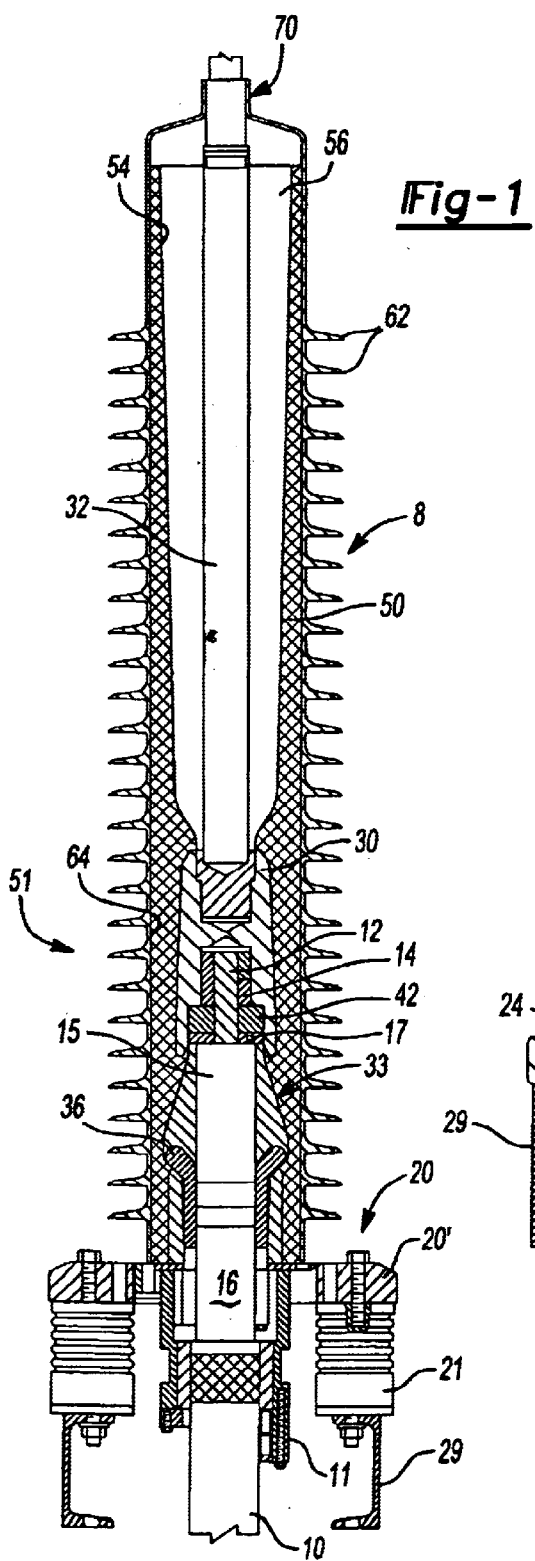
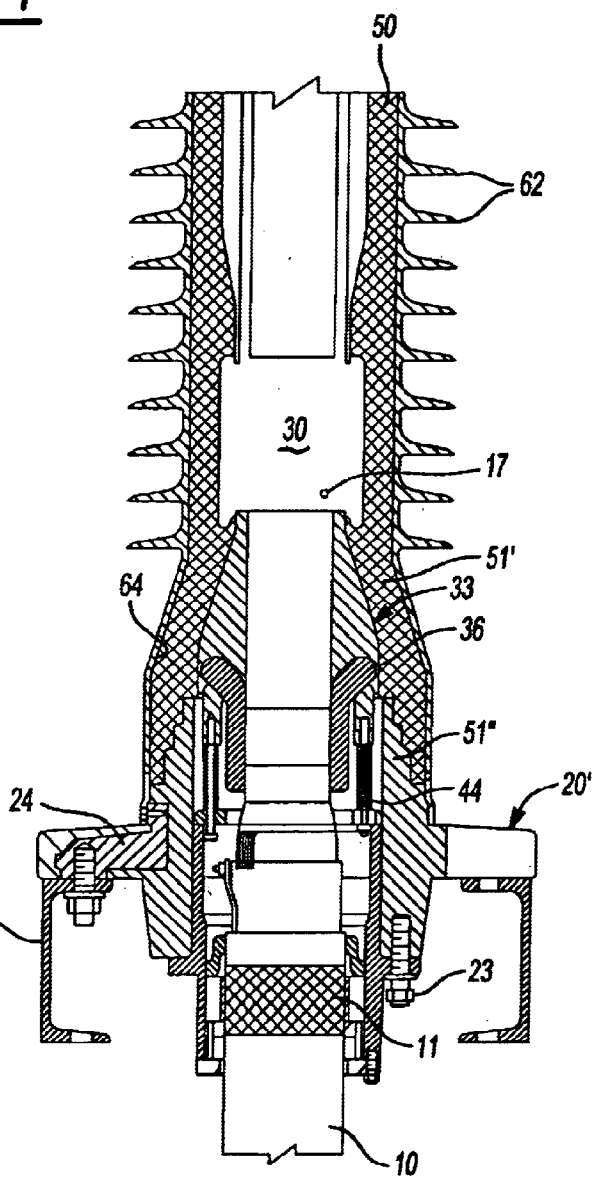

CABLE SEALING END

FIELD OF THE INVENTION

The invention relates to a cable terminator, preferably an outdoor terminator for high voltage according to the preamble of the main claim.

BACKGROUND OF THE INVENTION

Various types of terminators are known. Older designs are formed with porcelain insulators and an oil or other chemical filling. Such terminators have the disadvantage that they are not very robust mechanically, and no longer fulfil present-day environmental protection conditions with regard to possible substance leakage. A terminator without oil filling is described in EP 667 665 B1. A special feature of this is a rigid conducting element which is designed to take up lateral forces. The forces are carried away from the overhead conductor connection via the rigid conducting element, via a base body with a field control and insulating device, to the bearing structure. No field-controlling coating is present on the surface of the terminator—in particular in the region of the rigid conducting element.

SUMMARY OF THE INVENTION

An object of the invention is to propose a cable terminator, preferably a high-voltage outdoor terminator, which can be produced at low cost, is mechanically stable and is controlled in an electrically reliable manner.

The object is achieved by the features of the main claim. Further embodiments are found in the subclaims.

The terminator is mounted at one end on a base fitting, preferably for fastening to a cross-arm. Means for fastening the cable are formed on the base fitting and have an electrical duct inside the terminator. Situated at a top fitting are means for fastening an electrical conductor to the duct; means for electrically connecting the cable shield to earth potential and means for the field control and insulation at the inhomogeneous potential transitions at the cable end are present.

The insulating body generally bears on its surface an elastomeric material (preferably of silicone rubber) with a ribbed surface (shielding plates). The length and in particular diameter of the insulating body is to be chosen such that the demands for sufficient insulation and avoidance of atmospheric flashovers at full operating voltage are met. This requirement can be fulfilled by covering the surface of the insulating body with a voltage-dependent control coating. The diameter of the insulating body can then also be kept particularly small. The control coating is formed on the basis of microvaristors, preferably ZnO microvaristors (WO 9726693 A1). The preferred embodiment comprises ZnO ceramic particles which are embedded in a polymer matrix in a proportion of 60 to 75 per cent by weight. The ZnO particles are doped with mixed oxides in the order of 10% based on oxides of Bi, Cr, Sb, Co, Mn and further possible elements in smaller proportions. The polymer composition may be silicone rubber or polyethylene, depending on the base material of the carrier body. In the present case, the layer forming the control coating is formed inside the insulating-body casing designed with shielding plates. This layer according to the invention has the effect of changing the potential profile in such a way that the field lines are pushed more to the upper end of the terminator, so that, as a result of the changed electrical field distribution, voltage spikes or overvoltages at the location of the cable conductor connection are avoided. The effect of the field-strength-dependent control layer is described in detail in the article in Elektrizitätswirtschaft, 99 (2000), pages 68–73.

The insulating body is fastened to the base fitting. This type of fastening corresponds to the prior art (EP 667 665 B1). The customary means for electrically connecting the cable shield to earth potential and means for the field control (field control bodies) and insulation at the inhomogeneous potential transitions at the cable end are employed. What is essential is that, on the fastening to the base fitting, voids present between the cable end and the field control and insulating elements are closed by mechanical bracing with the base fitting.

The electrical duct, designed as a tube or as a pin, is connected to the cable conductor via contact elements and the electrical duct, the insulating body and the top fitting form a unit for assembly. The parts consisting of electrical duct with contact elements, insulating body and top fitting are produced separately. The top fitting consists essentially of a conductive end plate and a conductor connection piece, in which a thread may be incorporated for the fastening of a carrying lug. The electrical duct is preferably fastened inside the end plate by welding (or by another firm mechanical connection). The insulating body, consisting of insulating material, is bonded into the top fitting. The unit thus produced is lifted by a crane at a carrying lug into the assembly position and lowered from above over the prepared lower part of the terminator. The dimensions of the parts in the lower region of the arrangement forming a unit are designed such that upon assembly they slide in a self-centring manner into the base structure on the base fitting.

A contact is preferably fastened to the cable conductor with screws. The contact, in the form of a plug connection to the electrical duct, is provided by contact laminations. This plug connection is not designed to take up the forces on the terminator. In the present arrangement, the insulating body is therefore constructed and dimensioned so as to be able to take up all the mechanical forces. The plug connection is then free from mechanical loads. A typical magnitude of the transverse force to be expected is 5 kN, so that the mechanical design is to be dimensioned for this characteristic quantity.

The insulating body is produced from cast resin or another suitable material. It may be materially strengthened, for example with glass fibres. The insulating body is completely filled up with material from the bottom edge up to the level of the contact elements. A cavity is preferably formed in the interior of the insulating body. The cross-section of the cavity (the space filling) may be linear or be reduced in a curve in the shape of a funnel towards the top fitting. The form of the cavity allows the weight to be kept low, but the wall thickness may not be reduced further than a point where the bending forces can be taken up. In a preferred design, the inner surface of the cavity is lined with a conductive coating.

The essential process steps during assembly are as follows:

- preparation of the cable end, stripping the end insulation and uncovering the cable conductor
- attachment of the contact receptacle to the cable conductor
- fastening of the base structure to the base fitting
- by means of a crane, lifting of the assembly unit consisting of insulating body, top fitting and electrical duct
- lowering of the assembly unit onto the base structure fastened to the base fitting the parts are located in a self-centring manner fastening and bracing of the assembly unit to the base fitting fastening of the overhead conductor to the top fitting via a current terminal.

BRIEF DESCRIPTION OF THE DRAWINGS

Embodiments of the outdoor terminator are illustrated in the figures, in which, specifically:

FIG. 1 shows a first embodiment with constant outside diameter,

FIG. 2 shows another embodiment with stepped outside diameter,

DETAILED DESCRIPTION OF THE PREFERRED EMBODIMENTS

Figure 3:
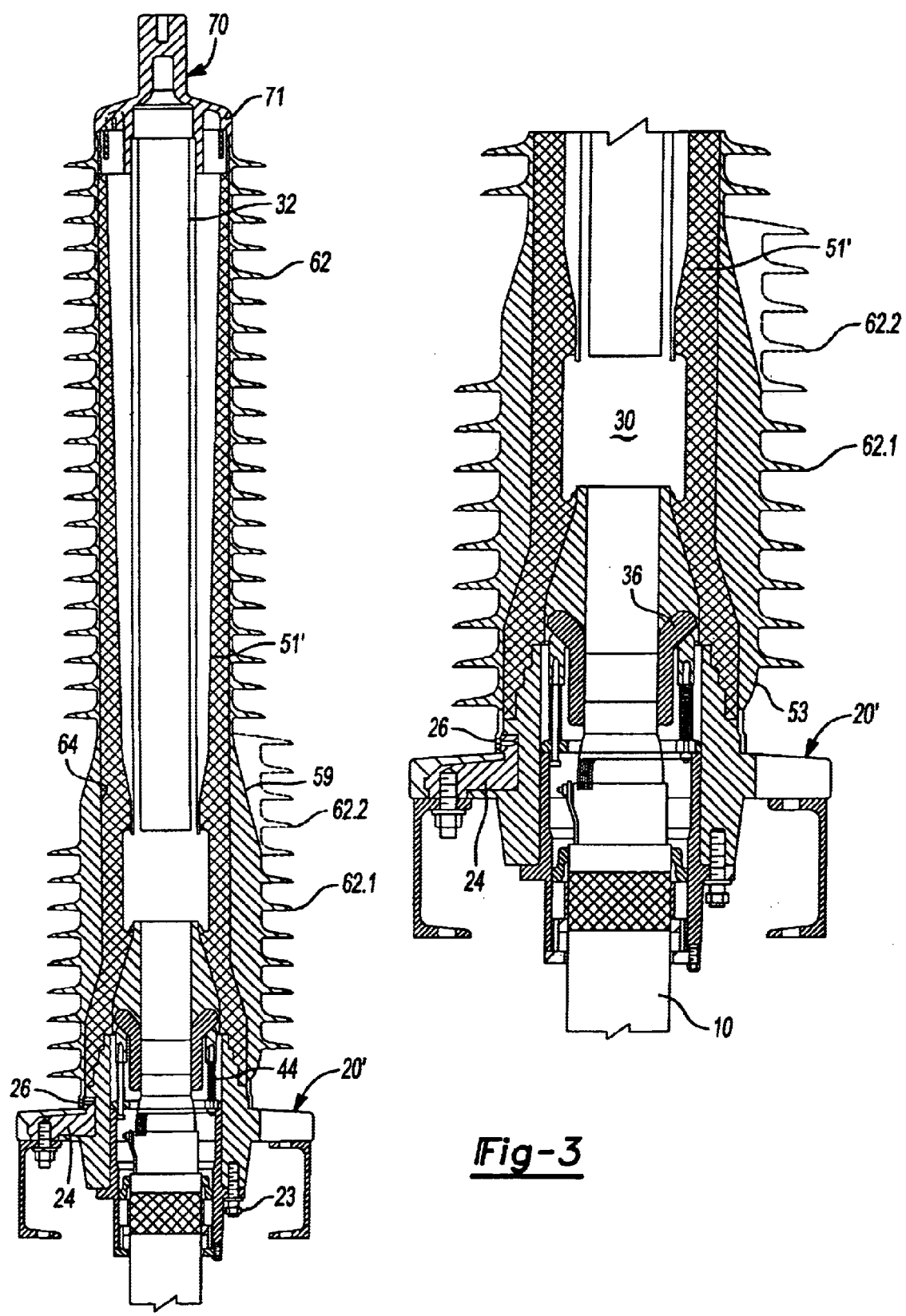
FIG. 3 shows an embodiment with different external contours in the right-hand and left-hand half of the figure.

The terminator according to the invention—for example for a rated voltage of 145 kV and having a conductor cross-section of 1200 mm$^2$—comprises an insulating body 50, preferably made of cast resin, which has a cavity 56 in its interior. In the lower region, it can be seen that at the end of the cable core 16(conductor 12 and conductor insulation 14) the arrangement of the field control element 36 and insulating element 51 is designed in accordance with the structure known to a person skilled in the art.

A high-voltage cable 10 is led into the lower region of the outdoor terminator 8. The shielding wires 11 of the cable 10 are in electrical contact with the flange 20' of the base part 20, which is mounted via insulators 21 on a cross-arm of a pylon.

As shown in FIG. 1, the diameter of the insulating body 50 is kept low over its entire length, but also in particular in the lower region (see also reference numeral 53 in FIG. 3), by using the voltage-dependent control coating 64. The control coating runs over the entire length of the insulating body from the earth potential to the high-voltage potential. The coating may be applied in varying thicknesses for an optimum controlling effect. The external field strength in all operating states is, nevertheless, below critical values.

As mentioned, the layer of ZnO microvaristors may be incorporated in a silicone bedding, or in a substance (for example polyethylene) suited to the material of the insulating body. The control coating lies, in the interior, on the insulating body, and the shielding plates lie on the control coating.

The insulating body 50 may consist of two parts (51', 51") bonded together and with different material qualities, since the lower part 51' (fastening to the base fitting up to the level of the contact elements on the cable conductor) is—without being covered with shielding plates—exposed to the environment and must be suitable for outdoor use. The upper part 51 may consist of a simple material, since this region is always covered with shielding plates 62. For an embodiment having shield plates 62.1 down to the base fitting, there is likewise an outer protective covering, so that a simple material quality of the insulating body may be employed for this region too.

The external contour 59 of the insulating body is preferably cylindrical over the entire length. Depending on the form and quality of the outer field-controlling coating 64, the insulating body may be designed with different diameters (greater at the bottom and decreasing at the top and a conical transition therebetween) (see FIGS. 2 and 3). The outer surface of the outdoor terminator 8 is covered with shields 62 made of RTV or LSR silicone rubber. The inner surface 54 of the cavity 56 may be designed to be conductive. It may be produced by conductive lacquer, conductive plasma coating, metal foil (sheet), metallisation or metallic cloth embedded in resin. The surface 54 is at high-voltage potential. The advantage of this design is that, even in the event of condensation of water in the cavity, the electrical reliability remains guaranteed, since the electrical field conditions are uniform given the high-voltage potential present.

The contact, embedded in the cast-resin body 50, embraces the end contact 30 at the lower end of the tube 32 capable of carrying current. The tube runs up to the top fitting 70 and is fastened there. A mechanically and electrically leaktight end cover 71 is fitted in the upper region of the terminator.

The connection between cable conductor 12 and electrical duct 32 is arranged at the transition from the full-volume base body in the lower region 53 to the cavity. The connector 30 clamps the uncovered cable conductor in the lower part. The current flows from the cable conductor 12 via the contact 17 to the tube 32. For this purpose, slidable contact or clamping elements are preferably provided between cable conductor and electrical duct. The transition between connector 30 and contact laminations 42 may be sealed by means of an O-ring.

The field control body 33 consists of silicone rubber and its control element 36 lies on the transition region between the conductor insulation 14 and the end of the conductive layer 15. The advantage of the invention lies in the design of an insulating body 50 with cylindrical external profile 59. The insulating body has, in the upper region, a constant outside diameter over its length. In the lower region 51, it accommodates the field control body 33 and is screwed onto the base part 20 (flange). A cavity 56, the inner surface 54 of which is designed to be electrically conductive, is formed in the upper region of the insulating body, in its interior. Admission of air into the cavity is possible.

The insulating body 50 is screwed, in the base part having a base plate or a flange 20, onto a supporting frame 29, for example a cross-arm, via insulating supports 21. Alternatively, the lower region of the insulating body may also be formed as a cast body which fits in mating fashion into the flange.

In the right-hand half of FIG. 3 there is an embodiment of the insulating body having a slightly convex thickening in the lower region 53. The metal ring 26, used for earth connection, can still be used in this design with an unchanged diameter. Shielding plates 62.1 (62.2) may be present in the convex region 53.

Figure 4A:
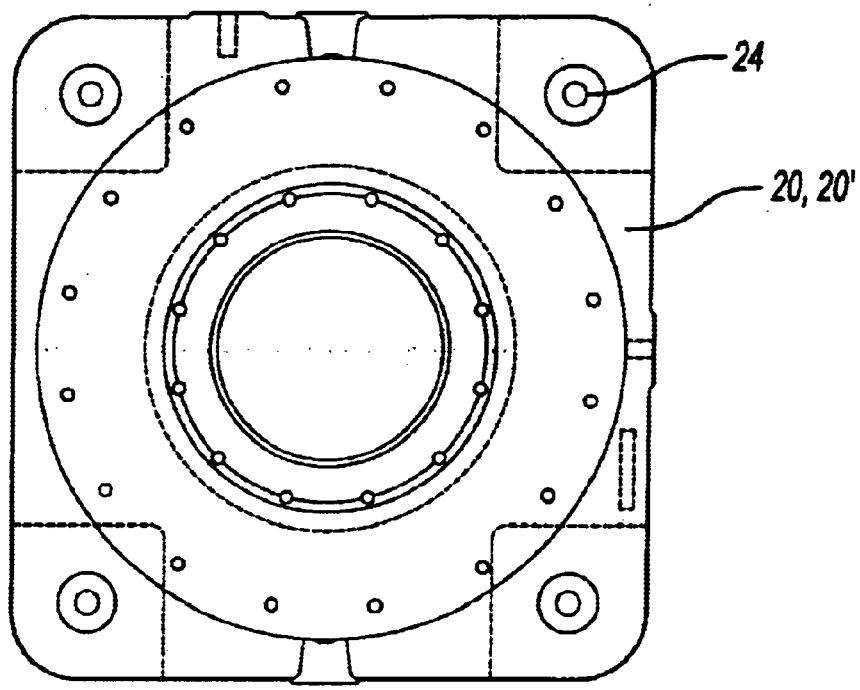
FIG. 4A shows a flange design.
Figure 4B:
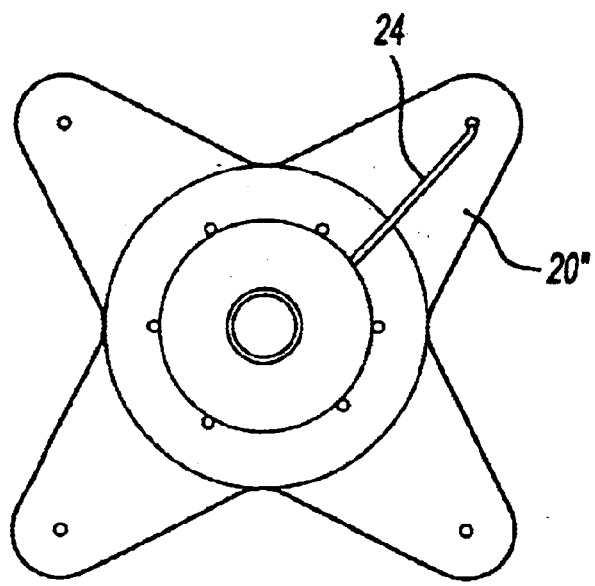
FIG. 4B shows an alternative flange design.

FIG. 4A shows a flange 20, 20'. FIG. 4B shows a different form of a flange 20". The fastening of the insulating body to either flange is effected using a plurality of screw connections 23 (FIG. 2 and FIG. 3). By tightening the screws, the assembly unit mentioned is braced via the spring elements 44 (see FIG. 3), so that voids present in the region of the field control body are completely closed. Reference numeral 24 (FIG. 3) indicates a conductive connection of the surface of the insulating body, for earth connection, to the cross-arm 29. Attached to the foot of the insulating body is a metal ring 26 (see FIG. 3). The metal ring 26 is brought into contact with the earth connection 24 via a screw.

What is claimed is:

1. A cable terminator, in particular an outdoor terminator for an electrical cable having a cable conductor, comprising: cable insulation, a conductive layer and a cable shield, the terminator being mounted at one end on a base fitting and having means on the base fitting for fastening the cable, having an electrical duct in the interior of the terminator, having a top fitting for fastening an electrical conductor to the duct, having means for electrically connecting the cable shield to earth potential, having a field control device and a field insulating device, having an insulating body and having means for fastening the insulating body to the base fitting, the electrical duct being connected to the cable conductor via contact elements, wherein:

the contact elements are designed as clamping elements, the insulating body is filled up with material from the region of the fastening means from the base fitting up to the level of the contact elements and wherein the filling is reduced towards the top fitting, such that an internal cavity is formed, and the insulating body is designed to take up mechanical load on the terminator, and wherein the surface of the insulating body is coated with a voltage-dependent field-controlling layer.

2. The cable terminator according to claim 1, wherein the field-controlling layer is formed from microvaristors.

3. The cable terminator according to claim 2, wherein the microvaristors used are ZnO microvaristors.

4. The cable terminator according to claims 1, 2, or 3, wherein the field-controlling layer runs over the entire length of the insulating body.

5. The cable terminator according to claims 1, 2, or 3, wherein an inner surface of the cavity bears a conductive coating.

6. The cable terminator according to claims 1, 2, or 3, wherein the insulating body is produced from cast resin.

7. The cable terminator according to claims 1, 2, or 3, wherein the electrical duct is a tube.

8. The cable terminator according to claims 1, 2, or 3, wherein the contact elements on the cable conductor are laminated contacts.

* * * * *